US011953691B2

(12) United States Patent
Zhang

(10) Patent No.: US 11,953,691 B2
(45) Date of Patent: Apr. 9, 2024

(54) EYEWEAR WITH INTEGRATED PERIPHERAL DISPLAY

(71) Applicant: Snap Inc., Santa Monica, CA (US)

(72) Inventor: Zhibin Zhang, Venice, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 18/180,425

(22) Filed: Mar. 8, 2023

(65) Prior Publication Data

US 2023/0229003 A1 Jul. 20, 2023

Related U.S. Application Data

(63) Continuation of application No. 17/550,539, filed on Dec. 14, 2021, now Pat. No. 11,624,925, which is a continuation of application No. 15/639,115, filed on Jun. 30, 2017, now Pat. No. 11,215,827.

(51) Int. Cl.
*G02B 27/01* (2006.01)
*G06T 19/00* (2011.01)

(52) U.S. Cl.
CPC .... *G02B 27/0172* (2013.01); *G02B 2027/011* (2013.01); *G02B 2027/0123* (2013.01); *G02B 2027/014* (2013.01); *G02B 2027/0178* (2013.01); *G06T 19/006* (2013.01)

(58) Field of Classification Search
CPC ............ G02B 27/0172; G02B 27/0174; G06T 19/006; G06T 2200/00
See application file for complete search history.

(56) References Cited

U.S. PATENT DOCUMENTS

| | | | |
|---|---|---|---|
| 6,219,186 B1 | 4/2001 | Hebert | |
| 6,690,451 B1 | 2/2004 | Schubert | |
| 7,697,750 B2 | 4/2010 | Simmons | |
| 8,401,783 B2 | 3/2013 | Hyung et al. | |
| 9,426,442 B2 | 8/2016 | Jacobs et al. | |
| 9,477,079 B2 | 10/2016 | Bailey et al. | |
| 9,779,478 B1 | 10/2017 | Wilson et al. | |
| 10,120,187 B2 | 11/2018 | Wittenbrink et al. | |
| 10,321,105 B2 | 6/2019 | Mcgrew | |
| 11,215,827 B1 | 1/2022 | Zhang | |

(Continued)

OTHER PUBLICATIONS

"U.S. Appl. No. 15/639,115, Examiner Interview Summary dated Jul. 31, 2019", 3 pgs.

(Continued)

*Primary Examiner* — Sardis F Azongha
(74) *Attorney, Agent, or Firm* — Schwegman Lundberg & Woessner, P.A.

(57) ABSTRACT

Systems and methods for projecting each of a chronology of images as a sequence of images using a shifting element as part of a near-eye display system are provided for use in virtual reality, augmented reality, or mixed reality systems. In some example embodiments, a chronology of images is received by a peripheral sequencing system. The system divides each image into image portions and generates sequences of image portions to recreate the images based on arrangement data. The system then causes a high-speed display of each sequence of images such that they appear simultaneous to a viewer. In some embodiments, the projection is transmitted to a shifting optical element such as a rotating micromirror that propagates a display to a user. In some embodiments, the system further detects and corrects for image and environmental distortions.

20 Claims, 10 Drawing Sheets

(56) References Cited

U.S. PATENT DOCUMENTS

| | | |
|---|---|---|
| 2008/0186308 A1 | 8/2008 | Suzuki et al. |
| 2011/0157707 A1 | 6/2011 | Tilleman et al. |
| 2016/0292921 A1 | 10/2016 | Evans et al. |
| 2017/0185037 A1 | 6/2017 | Lee et al. |
| 2017/0287215 A1 | 10/2017 | Lalonde et al. |
| 2018/0231832 A1 | 8/2018 | Liu et al. |
| 2018/0286320 A1 | 10/2018 | Tardif et al. |
| 2022/0244538 A1 | 8/2022 | Zhang |

OTHER PUBLICATIONS

"U.S. Appl. No. 15/639,115, Final Office Action dated Apr. 19, 2019", 20 pgs.

"U.S. Appl. No. 15/639,115, Non Final Office Action dated Sep. 5, 2019", 24 pgs.

"U.S. Appl. No. 15/639,115, Non Final Office Action dated Oct. 31, 2018", 17 pgs.

"U.S. Appl. No. 15/639,115, Notice of Allowance dated Feb. 10, 2021", 9 pgs.

"U.S. Appl. No. 15/639,115, Notice of Allowance dated Mar. 10, 2020", 8 pgs.

"U.S. Appl. No. 15/639,115, Notice of Allowance dated Jul. 2, 2020", 9 pgs.

"U.S. Appl. No. 15/639,115, Notice of Allowance dated Sep. 7, 2021", 10 pgs.

"U.S. Appl. No. 15/639,115, Response filed Feb. 5, 2020 to Non Final Office Action dated Sep. 5, 2019", 11 pgs.

"U.S. Appl. No. 15/639,115, Response filed Feb. 28, 2019 to Non Final Office Action dated Oct. 31, 2018", 11 pgs.

"U.S. Appl. No. 15/639,115, Response filed Aug. 19, 2019 to Final Office Action dated Apr. 19, 2019", 10 pgs.

"U.S. Appl. No. 17/550,539, Non Final Office Action dated Sep. 9, 2022", 20 pgs.

"U.S. Appl. No. 17/550,539, Notice of Allowance dated Nov. 29, 2022", 8 pgs.

"U.S. Appl. No. 17/550,539, Preliminary Amendment filed Apr. 22, 2022", 7 pgs.

"U.S. Appl. No. 17/550,539, Response filed Nov. 11, 2022 to Non Final Office Action dated Sep. 9, 2022", 9 pgs.

"DLP Technology for Near Eye Display", Texas instruments white paper, (Sep. 2014), 17 pgs.

\# EYEWEAR WITH INTEGRATED PERIPHERAL DISPLAY

CLAIM OF PRIORITY

This application is a continuation of U.S. patent application Ser. No. 17/550,539, filed on Dec. 14, 2021, which is a continuation of U.S. patent application Ser. No. 15/639,115, filed on Jun. 30, 2017, which are incorporated herein by reference in their entirety.

BACKGROUND

Some electronics-enabled eyewear devices, such as so-called smart glasses, include a near-eye display for displaying computer-generated images to a user while the user is wearing the eyewear. Such displays are in some instances provided by an optical head-mounted display that has the capability of reflecting artificial images while being at least partially transmissive, allowing the user to look at real images from the ambient environment.

Near-eye display optics offer an alternative to typical methods of projecting an image onto a surface for the user to view. Instead, near-eye display systems reflect a projection off a semi-transparent surface, such as the lenses of glasses, form an artificial pupil, and display an image directly on the retina of a user. The images displayed to the user with a near-eye display system may include a chronology of images to form a video feed for the user. Additionally, near-eye display systems can provide immersive capabilities, such as providing a virtual reality system or an augmented reality system.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
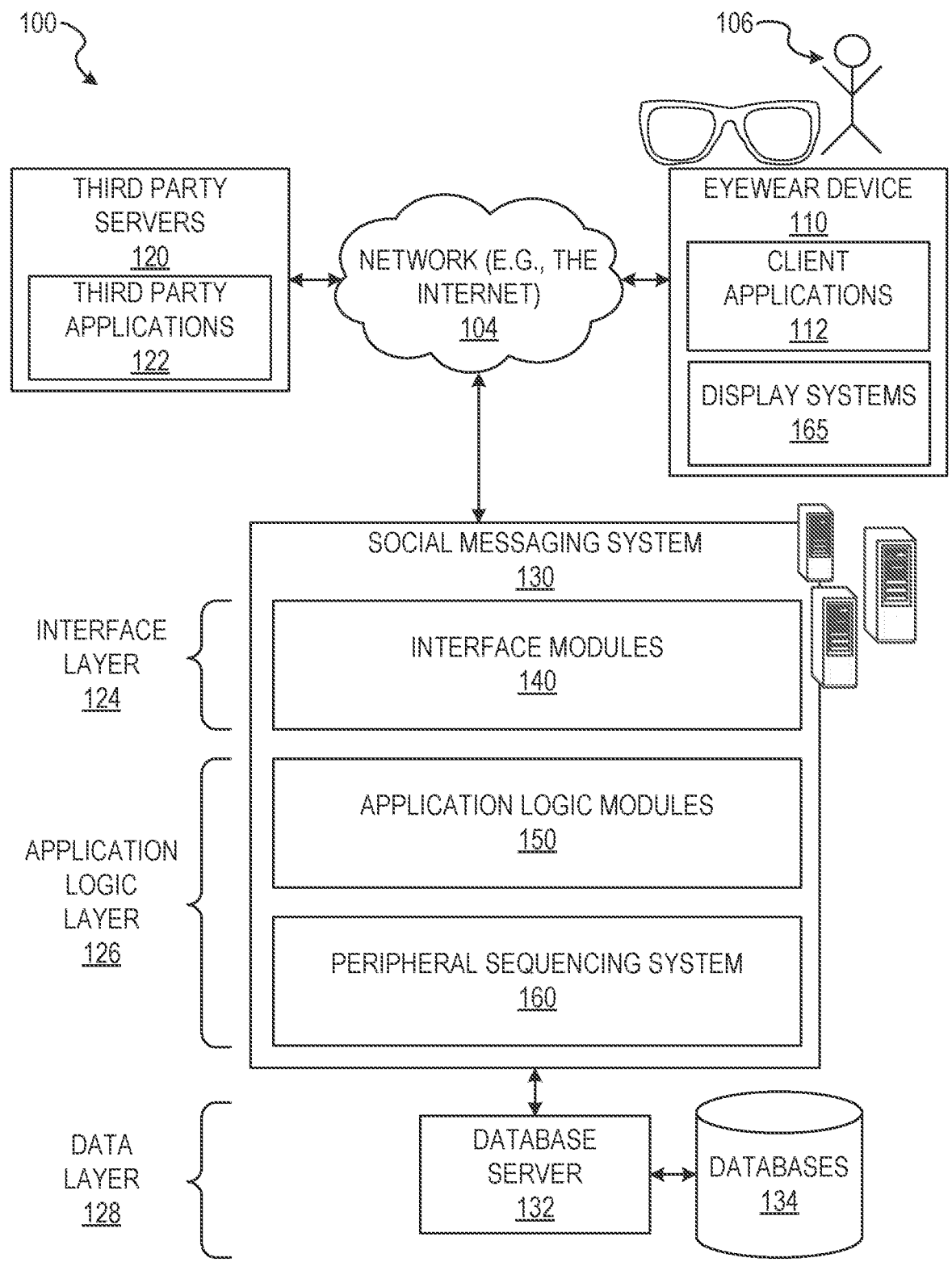
FIG. 1 is a network diagram depicting a network system having a client-server architecture configured for exchanging data over a network, according to some embodiments.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One of the aspects disclosed by the described embodiments includes an article of eyewear (e.g., glasses) having an integrated near-eye display mechanism configured to display portions of an image in a multi-oriented sequence in order to project the image across a user's entire viewing range. An advantage of using a near-eye display mechanism for a virtual reality or augmented reality display is that it allows a user to view portions of the display in the user's periphery rather than only within an area covered by the eyewear. However, there is a challenge in using a near-eye display to recreate an entire visual range, as near-eye display mechanisms are unable to reliably produce such a large image without compromising visual characteristics of the display, such as resolution and contrast. To address this problem, a perspective sequencing system is presented to display portions of an image in a high-speed sequence and at multiple orientations. The sequence of images is projected at a high enough speed that they appear to be simultaneous.

One general aspect includes a method for receiving a chronology of images for display to a user over an eyewear device having an integrated near-eye display mechanism. The chronology of images may include content intended for the user's far horizontal and far vertical peripheral ranges as well as content intended to appear within the user's range of depth perception (z-axis). The method further includes dividing an image from the chronology into multiple image portions that can be arranged to recreate the image. The method further includes receiving arrangement data that includes an arrangement of image portions along a horizontal range corresponding to the user's peripheral vision. The method further includes generating a sequence of image portions that corresponds to the arrangement of image portions along the horizontal range. The method further includes causing a display of a high-speed frame sequence that is configured, based on the arrangement data, to have a shifting orientation to cover the user's entire horizontal vision range.

According to some example embodiments, the corresponding structure for causing the display includes a display mechanism to project the image portions. In some example embodiments, the display mechanism comprises a partially transmissive reflector carried by a transmissive optical element, and a projector assembly for projecting visual information to be displayed to the user onto the transmissive reflector. In some embodiments, the transmissive optical element comprises an eyeglass lens held before the user's eye by an eyewear frame, the partially transmissive reflector comprising a partially reflective display mirror carried by the lens.

In some embodiments, a rotating micromirror is located entirely within the associated lens, for example being embedded within an optical medium provided by the lens. The rotating micromirror is a microelectromechanical system that alters a projection from a display mechanism to shift the orientation of the projection. In other embodiments, the rotating micromirror is located within the display mechanism and shifts the projection of light to reflect off a display mirror that is embedded within the optical medium.

FIG. 1 is a network diagram depicting a network system 100 having a client-server architecture configured for exchanging data over a network, according to one embodiment. For example, the network system 100 may be a messaging system where clients communicate and exchange data within the network system 100. In this example, the data pertains to various functions (e.g., sending and receiving text and media communication, determining geolocation, etc.) and aspects (e.g., peripheral image sequencing) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130 that may include various sub-components arranged into tiers (e.g., a data layer, an application logic layer, and an interface layer). As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as having a three-tiered architecture, the inventive subject matter is by no means limited to such an architecture.

As shown in FIG. 1, the interface layer 124 consists of interface modules (e.g., a web server) 140, which receive requests from various client-computing devices and servers, such as an eyewear device 110 executing client applications 112. In response to received requests, the interface modules 140 communicate appropriate responses to requesting devices via a network 104. For example, the interface modules 140 can receive requests such as Hypertext Transfer Protocol (HTTP) requests, or other web-based Application Programming Interface (API) requests.

The eyewear device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the eyewear device 110 is executing the client applications 112. The client applications 112 can provide functionality to present information to a user 106 and communicate via the network 104 to exchange information with the social messaging system 130. The eyewear device 110 can comprise a computing device that includes at least a display and communication capabilities with the network 104 to access the social messaging system 130. In some example embodiments, the eyewear device 110 is communicatively coupled over the network to one or more other devices, the other device including but not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. The user 106 can be a person, a machine, or other means of interacting with the eyewear device 110. In some embodiments, the user 106 interacts with the social messaging system 130 via the eyewear device 110.

As shown in FIG. 1, the data layer 128 has a database server 132 that facilitates access to information storage repositories or data structures (e.g., databases), such as databases 134. The databases 134 may further include various forms of information storage repositories such as data tables. These databases 134 are storage devices that store data such as member profile data, social graph data (e.g., relationships between or among members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the eyewear device 110 to send and receive messages that include text and media content such as pictures and video. The eyewear device 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in application modules on any one of the systems.

As illustrated in FIG. 1, the social messaging system 130 includes a peripheral sequencing system 160. In various embodiments, the peripheral sequencing system 160 can be implemented as a standalone system and is not necessarily included in the social messaging system 130. In some embodiments, the eyewear device 110 includes a portion of the peripheral sequencing system 160. For example, all or part of the peripheral sequencing system 160 may be included independently, included within the social messaging system 130, included on a separate mobile device of the user 106, included as a third-party application 122, or included in the client applications 112. In embodiments where the eyewear device 110 includes a portion of the peripheral sequencing system 160, the eyewear device 110 can work alone or in conjunction with the portion of the peripheral sequencing system 160 included in a particular application server or included in the social messaging system 130.

Figure 2:
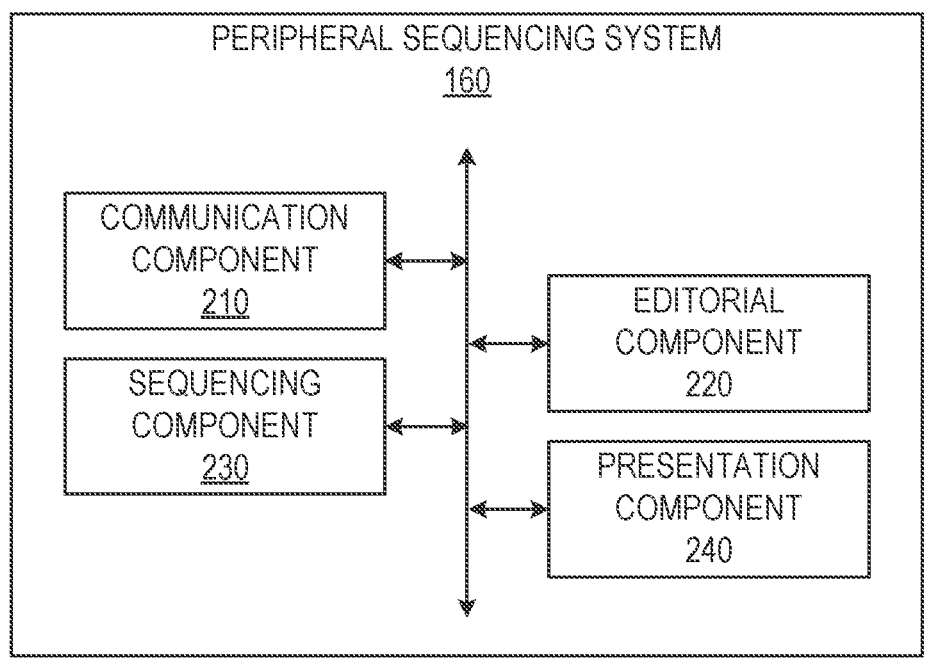
FIG. 2 is a block diagram illustrating an example embodiment of a peripheral sequencing system.

FIG. 2 is a block diagram 200 illustrating an example embodiment of the peripheral sequencing system 160. The peripheral sequencing system 160 is shown to include a communication component 210, an editorial component 220, a sequencing component 230, and a presentation component 240. All, or some, of the components 210-240 communicate with each other, for example, via a network coupling, shared memory, and the like. Each component can be implemented as a single component, combined into other components, or further subdivided into multiple components. Other components not pertinent to example embodiments can also be included, but are not shown.

The communication component 210 provides various communications functionality. For example, the communication component 210 receives a chronology of images for presentation to a user 106 on an eyewear device 110. In some example embodiments, the communication component 210 is located on the social messaging system 130 and provides functionality to access data structures to receive the chronology of images. For example, the communication component 210 is able to receive messages over the database server 132 from one of the databases 134. In some example embodiments, the communication component 210 accesses a chronology of images in response to a request from the user 106 or another user. For example, a second user may send, over the network, a video intended for the user 106 to experience in a virtual reality display over the eyewear device 110. The video, in this case, would be received as a chronology of images by the communication component 210. Thus, the communication component 210 provides functionality to receive messages from data structures in response to a user request.

The editorial component 220 divides images in the chronology into a plurality of image portions. In some example embodiments, the editorial component 220 divides the images based on instructions associated with each image, such as within the metadata of an image. For example, an image may contain, in the metadata, instructions to divide an image having a 180° panoramic view into 12 equal sections measuring 15° each in width. In other example embodiments, the editorial component 220 may divide the image portions based on arrangement data received from the eyewear device 110, the arrangement data based on an ideal division of images for projection.

The sequencing component 230 generates a sequence of image portions from images within the chronology of images, the sequence based on arrangement data received from the eyewear device 110. In some example embodiments, the arrangement data includes a arrangement of images that is a best match for the eyewear device 110 and the program (e.g., virtual reality, augmented reality) that is being used. In some example embodiments, the arrangement data includes sensor data collected by the eyewear device 110 about the user's 106 current environment (such as from sensors on the eyewear device 110 or from sensors communicatively connected with the eyewear device 110).

In some example embodiments, the sequencing component 230 then analyzes the arrangement data and sensor data to determine and initiate any display adjustments for the image portions. For example, one or more image portions of an image within the chronology of images may include a chromatic distortion. The sequencing component 230 can use a machine learning program or another software algorithm to detect and correct the distortion.

The presentation component 240 causes a display of the image portions in sequence to the user 106 on the eyewear device 110 as part of a near-eye immersive display such as virtual reality or augmented reality. Specifically, the presentation component 240 receives sequences of image portions from the sequencing component 230, each sequence arrangeable to recreate a respective image. The presentation component 240 then causes a near-eye display mechanism to project each sequence of image portions at a high speed, such that the image portions appear as one simultaneous image to the user 106.

Figure 3:
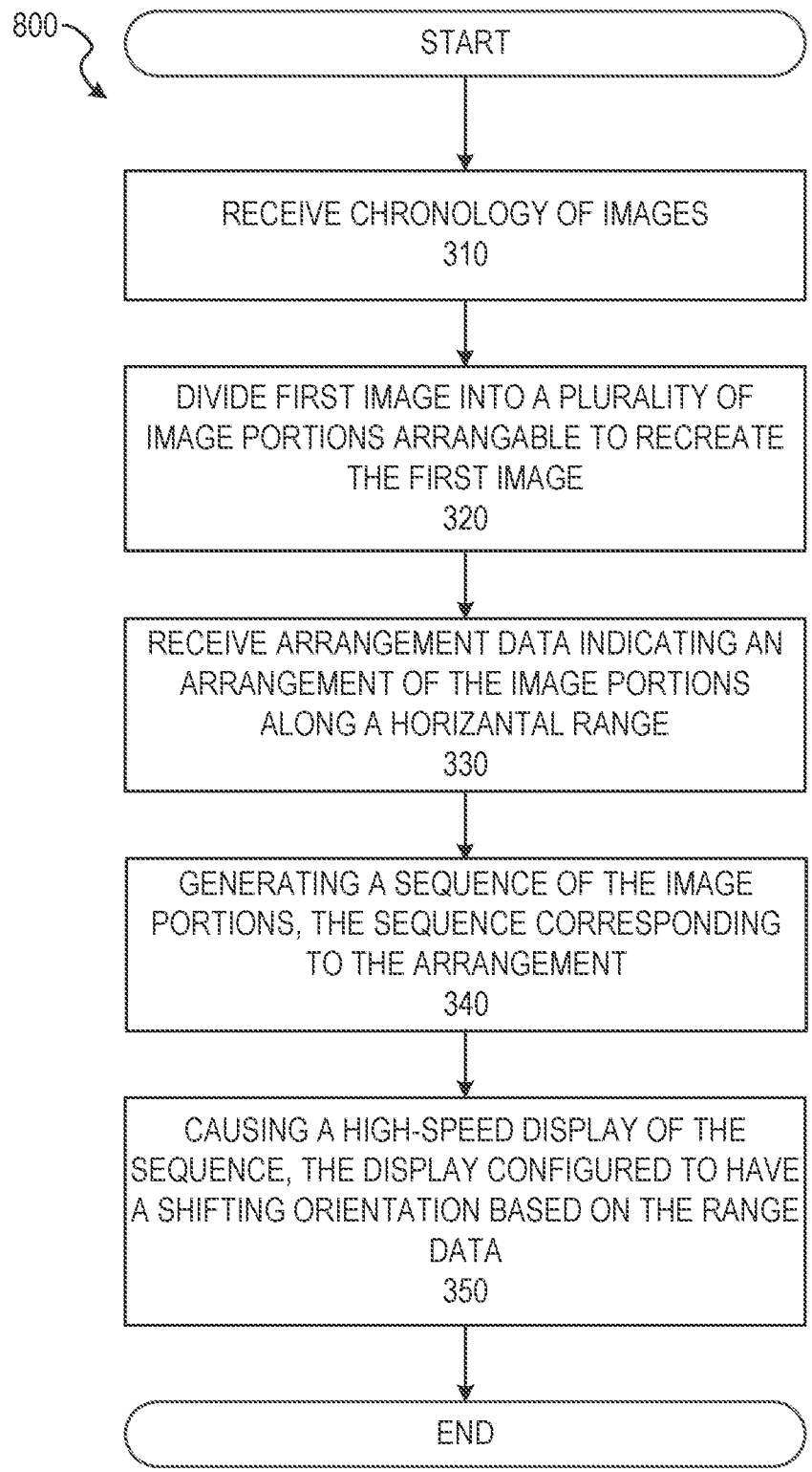
FIG. 3 is a flow diagram illustrating an example method for generating a high-rate frame sequence, according to some example embodiments.

FIG. 3 is a flow diagram illustrating an example method 300 for generating a high-rate frame sequence, according to some example embodiments. The operations of the method 300 may be performed by components of the peripheral sequencing system 160, and are so described below for the purposes of illustration.

At operation 310, the communication component 210 receives, from the social messaging system 130 and over the network 104, a chronology of images. In example embodiments, the chronology of images can be received in response to a request from the user 106, such as in response to a user input, or delivered as part of a message from another user on the social messaging system 130. The chronology of images can be delivered on a near-eye display mechanism, which can act as a pupil to convert the light directly into an image on the retina of the user 106. The near-eye display mechanism can be used for virtual reality, augmented reality, or mixed virtual reality representation to the user 106 through the eyewear device 110.

In an example, the user 106 is on a skiing trip with several friends and is on a snowshoe tour while his friends ski. One of the user's friends, Dara Smith, sends him a tag icon on the social messaging system 130, the tag icon including a tagged Global Positioning System (GPS) location and the text "Check out this slope." Dara intends for the user 106 to view a slope that she is about to ski down. In order to directly view the slope, the user 106 must turn 150° to the left. The user 106, meanwhile, is running an augmented reality system on the near-eye display mechanism on the eyewear device 110. Based on the user's current use of augmented reality, the social messaging system 130 determines to send an image of the text message and a directional arrow to the portion of the user's display that is closest to the location tag. Additionally, the communication component 210 receives instructions from the social messaging system 130 to display a message icon, indicating that the user 106 has unopened email, and a compass icon that shows the current direction that the user 106 is facing. If no other icons are received by the communication component 210 to display to the user 106, the text with the arrow icon, the message icon, and the compass icon comprise a current chronology of images that will be shown to the user 106. Further, if the user 106 turns his head, images in the chronology will display an altered compass icon to reflect the change in orientation.

At operation 320, the editorial component 220 divides each image in the chronology of images into a plurality of image portions that are arrangeable to recreate the image. In example embodiments, the editorial component 220 divides each image in response to a determination that the image will have inadequate visual characteristics (e.g., resolution, sharpness) due to the display format. For example, an augmented reality display may include a reproduction of the images in a very wide format, such as a peripheral range that would be visible to a human's peripheral vision. Rather than attempt to project the image from a single orientation, which could impair the visual characteristics of the image, the editorial component 220 divides the image into sections, such as 15° sections, to be shown from multiple orientations. Thus, any section within the user's visual range will have optimal visual characteristics, particularly in case the user chooses to direct his or her focal vision to a particular section. The determination to divide the image into sections may be made using various deterministic and probabilistic solutions, such as a machine learning system to determine similarities between or among images within the social messaging system 130.

In the example above, as part of the augmented reality system, an image within the chronology should be produced on virtually the user's entire visual range. As a note, although a human peripheral range can be as large as 240°, for practical purposes, a peripheral range of 180° is used in this example augmented reality system. As mentioned previously, representing an image for this range is impractical from a single orientation. Thus, the editorial component 220 determines an appropriate range for image portions of an image and then divides the image into these portions. In this example, the editorial component 220 determines that the image should be divided into 12 equal 15° portions. This determination can be made based on the augmented reality image to be displayed to the snowshoeing user 106 not having a high resolution.

In an alternative example, if a user is jogging on a treadmill and uses a virtual reality system to simulate jogging on a beach, the beach may be better viewable with a higher resolution since a full beach image is to be displayed to the user rather than just several icons. Based on this higher-resolution image, the editorial component 220 determines that the beach image should be divided into 18 equal 10° portions. Other factors that the editorial component 220 bases a determination on may include a determination of a depth range and a vertical periphery range in addition to a horizontal periphery At operation 330, the sequencing component 230 receives arrangement data that indicates an arrangement of the image portions along a horizontal range to recreate the image for display to the user 106. In some example embodiments, the arrangement data includes preferred set of display characteristics (e.g., resolution, contrast, display angle) for each portion of the user's visual range where each image portion will ultimately be projected.

For example, the arrangement data may indicate that a transmissive optical element has a curvature that will slightly distort a projection that is travelling to the far periphery of the user's vision in a near-vision virtual reality system. In this example, the arrangement data for portions in the far periphery, such as 0°-30° and 150°-180°, would differ from portions closer to the user's focal range, such as 60°-120°. In some example embodiments, the arrangement data further includes an arrangement of the image portions along a vertical range and on a depth perspective range (e.g., z-axis). In some example embodiments, the arrangement data is located within a database such as one of the databases 134 and is accessible via the database server 132. In some example embodiments, the arrangement data is stored on the eyewear device 110 and transmitted to the social messaging system 130 via the network 104.

In the above example, the arrangement data about the snowshoeing user's eyewear and augmented reality capabilities is received by the sequencing component 230. This includes data about the limits of the display characteristics for the augmented reality system and about any distortion that occurs with the eyewear device 110. Additionally, the sequencing component 230 may further receive display constraints based on sensor data. For example, sensor data from one or more sensors on the eyewear device 110 may indicate that there is a high saturation of light around the snowshoeing user due to the snow reflecting light, and that there must be a minimum contrast value for the augmented reality system to ensure that all icons and images are viewable.

At operation 340, the sequencing component 230 generates a sequence of the image portions that corresponds to the arrangement of the image portions. In some example embodiments, the sequencing component 230 generates an order of the image portions with the image portions intended to be shown in the user's 106 left periphery (vision range starting at 0°) occurring first and the image portions intended to be shown in the user's right periphery (vision range ending at 180°) occurring last. In some example embodiments, the sequencing component 230 receives data from the eyewear device 110 about the current orientation of a rotating micromirror as part of the eyewear device 110, in order to display the image portions in the most efficient manner. For example, the image portions for a first image can be ordered starting at 0° and ending at 180° in the sequence, and for a second image (the next image in the chronology), the image portions can be ordered from 180° to 0° in the sequence, since the rotating micromirror will already have a 180° orientation when it finishes projecting image portions from the first image.

In the above example, the sequencing component 230 determines the sequence of image portions for each image within the chronology of images to be displayed to the snowshoeing user 106 on the eyewear device 110 using the augmented reality system. Predictably, several of the image portions will appear to be static, such as those image portions that do not include any icons, and are thus transparent such that the user can see through them. The image portions that contain the message icon may be similarly static, since this icon will not change until the user checks his email. The compass icon, in contrast, will appear to change every time the user changes orientation; thus, each image portion having the compass in the chronology of image portions has a good chance of differing from the other image portions. Also, since the text is received from Dara Smith at some time point, the image portions that will display the icon will reflect the change as soon as the text is received.

In operation 350, the presentation component 240 causes a high-speed display of the sequence using near-vision projection on the eyewear device 110. In some example embodiments, the projection of image portions is directed to a shifting element (e.g., rotating micromirror) that has a shifting orientation to project each image portion to a different part of the user's 106 visual range. In some example embodiments, the presentation component 240 causes the projection of the image portions to exceed 1000 frames per second, such that, from the perspective of the user 106, the portions appear to be simultaneous. Thus, to the user 106, the near-vision display appears to show the chronology of images in sequence, rather than the sequence of each image portion in the chronology.

Additionally, the presentation component 240 can alter the display based on the content of the images or sensor data collected from sensors on the eyewear device 110. For example, the presentation component 240 can detect a chromatic aberration within the images to be displayed, the detection incorporating an algorithm that detects similarities using a machine learning system. Additionally, the presentation component 240 can detect a contrast imbalance between the images and the outside environment (such as an overrepresentation of short-wavelength light) and adjust the contrast in the images to compensate.

In the above example, after the sequencing component 230 determines the sequence for each image portion for each image within the chronology, the presentation component 240 causes an augmented reality display for the snowshoeing user 106 by showing all image portions of a first image in the order of the sequence, then all image portions of a second image in the order of the sequence, and so on. Since these image portions are shown at a very rapid frame rate, the user 106 may only recognize the transitions between images, such as between the first image and the second image, rather than the order of the image portions.

Figure 4:
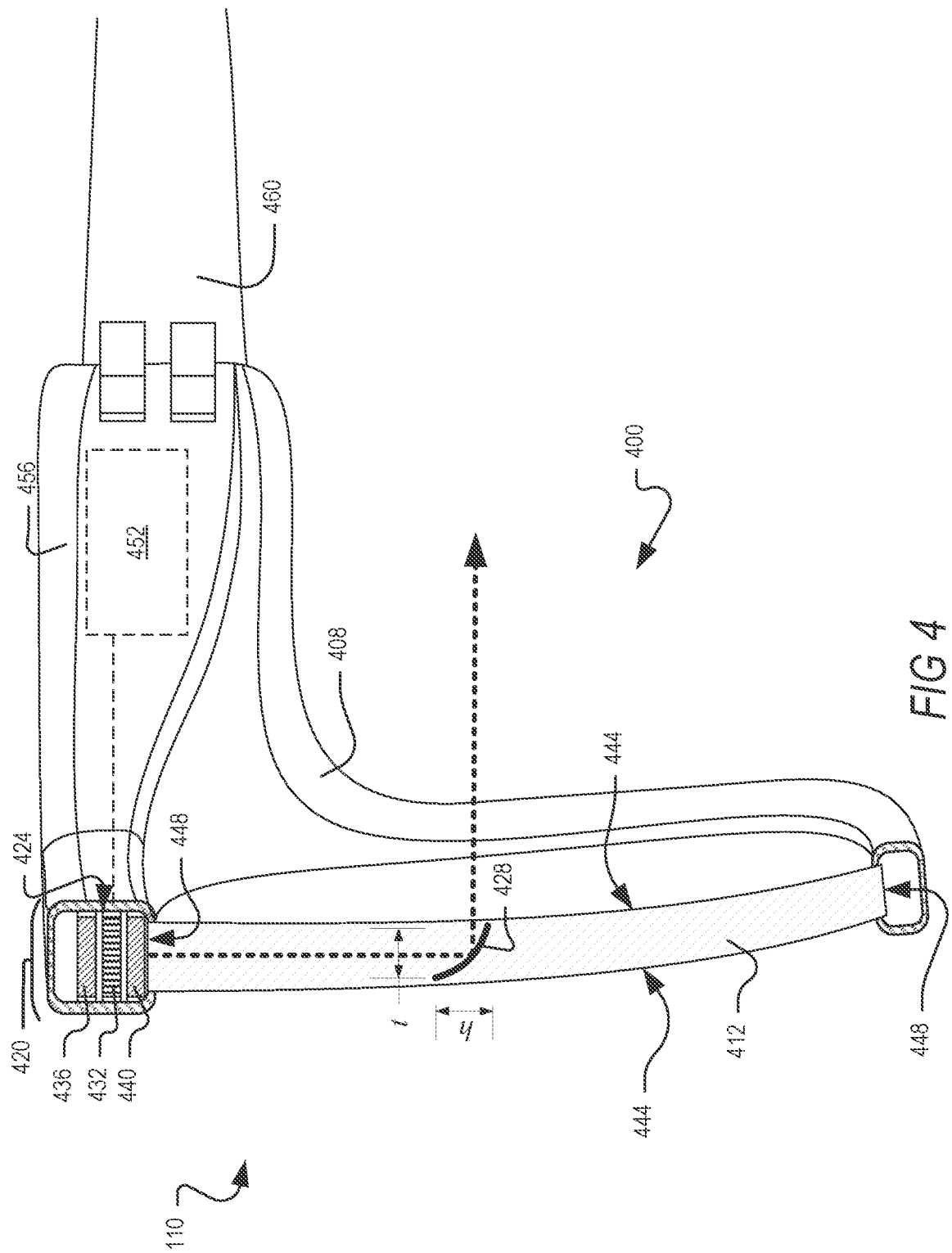
FIG. 4 is a schematic elevational cross-section of an eyewear device, according to an example embodiment.

FIG. 4 is a schematic elevational cross-section of an eyewear device 110, according to an example embodiment, the cross-section being taken transversely through one of a pair of lenses forming part of the eyewear device 110. The eyewear device 110 includes a frame 408 and a pair of transmissive optical elements in the form of respective lenses 412 supported by the frame 408. The lenses 412 are in this example non-corrective lenses, therefore allowing light to pass through substantially without distortion. The eyewear device 110 is in this example embodiment configured for outdoor use as sunglasses, so that the lenses 412 are sunglass lenses that filter ambient light passing through onto the eyes of a user. Note that different types of lenses or other transmissive optical elements can, in other embodiments, be used to provide a base for an integrated near-eye display mechanism 420. For example, the display mechanism 420 can, in other embodiments, be provided in cooperation with optically corrective lenses, with swimming goggles, with a head-mounted visor, or the like.

Note also that, for clarity and brevity of description, the orientation of and spatial relationships between various elements of the eyewear device 110 are described as being, for example, horizontal or lateral, vertical, above or below another element, and the like. These spatial relationships and orientations are described with respect to orientation of the eyewear device 110 in an idealized operative condition in which the eyewear device 110 is borne by a user whose head is upright and level. It will be appreciated, however, that the orientation of the eyewear device 110 and its various parts is changeable in absolute terms, and that the above-mentioned terms describing spatial orientation of the various components are non-limiting.

In FIG. 4, the eyewear device 110 includes an example display mirror 428 with a curved reflective surface. In some example embodiments, a rotating micromirror is located within an optics subassembly 440 and reflects light to the display mirror 428. The reflective surface of the display mirror 428 is curved to focus light emanating from a projector assembly 424 at a point corresponding more or less to the user's pupil. In this way, a virtual image representing visual information generated by the projector assembly 424 is presented to the user, providing a near-eye display for displaying visual information to the user. In some example embodiments, the display mirror 428 is itself a rotating micromirror capable of shifting the reflection orientation of light rays projected onto it by the projector assembly 424 towards the eye of a user wearing the eyewear device 110.

In an example embodiment of FIG. 4, the projector assembly 424 comprises a display matrix or display panel 432 sandwiched between an illumination subassembly 436 and an optics subassembly 440. The illumination subassembly 436 provides backlighting for the display panel 432. The optics subassembly 440 comprises lenses and filters configured to condition and direct light emitted by the display panel 432 onto the reflective surface of the display mirror 428. In this example embodiment, the display panel 432 is a liquid crystal display (LCD), but in other embodiments the display panel 432 may be of any other suitable type, for example a liquid crystal on silicon (LCOS) display, an organic light-emitting diode (OLED) display, or any other such display. The optics subassembly 440 can in some embodiments include lenses, optical coatings, prisms, mirrors, waveguides, holograms, spatial light modulators, and other optical components in various combinations.

In this example embodiment, the display mirror 428 is embedded wholly within the optical material of the lens 412. Referring again to FIG. 4, it will be seen that the lens 412 has a pair of oppositely outwardly facing major outer faces 444 connected by a peripheral edge face 448 extending transversely between the major outer faces 444 at the periphery of the lens 412. Thus, in this example embodiment, the display mirror 428 is located between the major outer faces 444 of the lens 412, and does not protrude from the smooth major outer faces of the lens 412. As a result, the lens assembly comprising the lens 412 and the display mirror 428 is superficially similar in appearance to analogous eyeglass lenses without an integrated display element.

It will be appreciated that, to allow location of the display mirror 428 wholly within the lens 412, a thickness dimension (t) of the display mirror 428 is somewhat smaller than a corresponding thickness dimension of the lens 412. With reference to FIG. 4, it will be understood that the thickness dimension of the lens 412 is defined by the transverse distance between the major outer faces 444 of the lens 412. In this example embodiment, the thickness of the lens 412 is about 6 mm, the thickness (t) of the display mirror 428 is about 6 mm (although fractionally smaller that the thickness of the lens 412), and a related height dimension (h) is about 6 mm. The values for these dimensions for some other example embodiments vary between 2 mm and 10 mm.

The projector assembly 424 is housed in the top bar of the frame 408 such that light emitted by the projector assembly 424 enter the optical medium provided by the lens 412 at an operatively top portion of the peripheral edge face 448. Such beams of light or photons thereafter travel via the optical medium provided by the lens 412 onto the reflective curved surface of the display mirror 428. The display mirror 428 changes the direction of light impinging thereon so that it travels more or less horizontally, exiting the lens 412 at an inner one of the major outer faces 444 (i.e., the major outer face 444 of the lens 412 closest to the user) towards the user's eye. In some embodiments, a rotating micromirror (as part of the display mechanism 420 or in place of the display mirror 428) further rotates to change the orientation of the light traveling towards the user's eye. In some example embodiments, a rotating prism is used instead of a rotating micromirror, allowing the projection to refract through the prism in order to change the orientation of the projection. Such a change in orientation allows different image portions to appear in the visual range of the user. The various optical components of the optics subassembly 440 can be sized and shaped to magnify the image projected by the display panel 432, so that the image viewed by the user from the convex reflective surface of the display mirror 428 is larger in one or more dimensions than the image emitted from the display panel 432.

Note that the display mirror 428 is at least partially transparent in the direction of its thickness dimension. Light that travels from the environment across the thickness dimension of the lens 412 and that is coincident with the display mirror 428 thus travels at least partially through the display mirror 428 and onto the user's eye. The user is thus afforded a substantially unimpeded view of the environment through the display mirror 428 when no information is displayed thereon. As is illustrated in FIGS. 5-8, the optical characteristics of the lens 412 and the display mirror 428 are in this example embodiment selected such that, to the user, the display mirror 428 is visually substantially indistinct from the lens 412 by which it is carried. Phrased differently, the display mirror 428 is substantially invisible to the user.

In an example embodiment, the projector assembly 424 is connected to controlling circuitry in the example form of a computer system 452 incorporated in the frame 408 of the eyewear device 110. In this example embodiment, electronic components of the computer system 452 are housed in one or more lateral end pieces 456 of the frame 408. The computer system 452 is connected to the display panel 432 of the projector assembly 424 to control display of the computer-generated imagery projected by the projector assembly 424 onto the display mirror 428. In the embodiment of FIG. 4, the computer system 452 is powered by a suitable rechargeable battery (not shown), integrated in the frame 408. In some embodiments, some components of the computer system 452 (for example, the rechargeable battery) can be incorporated in one or more temples 460 of the frame 408.

In some example embodiments, the text that is displayed via the display mechanism 420 is controlled by the peripheral sequencing system 160 on the social messaging system 130, which communicates with the computer system 452 wirelessly over the network 104. In other example embodiments, the computer system 452 of the eyewear device 110 controls the display of text communications via the display mechanism 420, and thus would include the peripheral sequencing system 160 described in FIG. 2. In other example embodiments, the eyewear device 110 is configured to serve as a peripheral device for use with a master mobile electronic device that includes the peripheral sequencing system 160, such as a smartphone, carried by the user and wirelessly coupled to the computer system 452 of the eyewear device 110. The computer system 452 may further include one or more sensors to collect sensor data that is mounted on the frame 408 and communicatively coupled to the controlling mobile electronic device and/or to one or more processors forming part of the computer system 452.

In other embodiments, the computer system 452 of the eyewear device 110 is a fully enabled independent onboard computer system to provide multiple computing and communication functions independently from a separate mobile electronic device. The eyewear device 110 may in some of these embodiments be configured to function as a wearable smartphone. In some embodiments, the eyewear device 110 may further include one or more integrated onboard cameras mounted on the frame 408. In some such embodiments, the camera(s) may be operatively connected to the display mechanism 420 (e.g., via the computer system 452) to enable heads-up display via the display mechanism 420 of visual information captured by the camera(s).

In this example embodiment, the display mechanism 420 and computer system 452 of the eyewear device 110 are configured to provide exclusively for display of text characters in the heads-up display. Moreover, the display mechanism 420 and the display mirror 428 are shaped and configured such as to provide for heads-up display, via the display mirror 428, of only a single line of text characters. "Text characters" mean graphical characters forming part of a predefined set of characters, graphic symbols, or graphic devices available for display. Such a set of available symbols may be provided, in isolation or in combination, by one or more extended character sets including, for example, Unicode characters, ASCII characters, emoticon sets, and the like. In other embodiments, the display panel 432 and controlling electronics may be configured to provide also for non-text display, e.g., to display computer-generated graphical information such as, for example, exercise graphs, health information graphs, statistical information, animated images, and the like.

Yet further, the projector assembly 424 is in this example embodiment configured for providing a monochrome display, so that the line of text displayed to apparently be superimposed on the lens 412 is invariably in a single, consistent color. In other embodiments, the projector assembly 424 may be configured for providing a multi-color display, the display panel 432 for example being an RGB LCD.

A benefit of providing for a monochrome display limited to the display of text characters as in the described example embodiment is that it allows for increased compactness of electronic components of the display mechanism 420 and the computer system 452. This facilitates structural integration of these components into the frame 408 without significant adverse effects to the size, weight, and/or appearance of the eyewear device 110. Note, however, that some embodiments provide for such comprehensive structural integration of the display and computer components while providing for greater display options and/or for multicolor display.

As will be evident from the description herein, the display provided by the display mechanism 420 provides for display of information overlaid on a view of the ambient environment visible to the user through the lenses 412, in order to produce an augmented reality experience. This is because the display mirror 428 is partially reflective, allowing passage of sufficient light through the display mirror 428 in a direction transverse to the lens 412 to allow a substantially unimpeded view of the surroundings. Thus, when no information is displayed to the user by the display mechanism 420, the eyewear device 110 is usable in a conventional fashion, with little or substantially no obstruction of the user's view.

Benefits of the example eyewear device 110 include that the display mechanism 420 is integrated in an apparently conventional structure of the frame 408 and lenses 412, with minimal exterior features that prominently distinguish the eyewear device 110 from similar eyewear having no integrated display. This is achieved partly by limiting the height dimension (h) of the display mirror 428, which in the example embodiment of FIG. 4 enables location of the display mirror 428 wholly within the corresponding lens 412. It will be appreciated that, in the configuration of the described example embodiments, the thickness dimension (t) of the display mirror 428 is proportional to the vertical dimension (h) of the display mirror 428.

Figure 5:
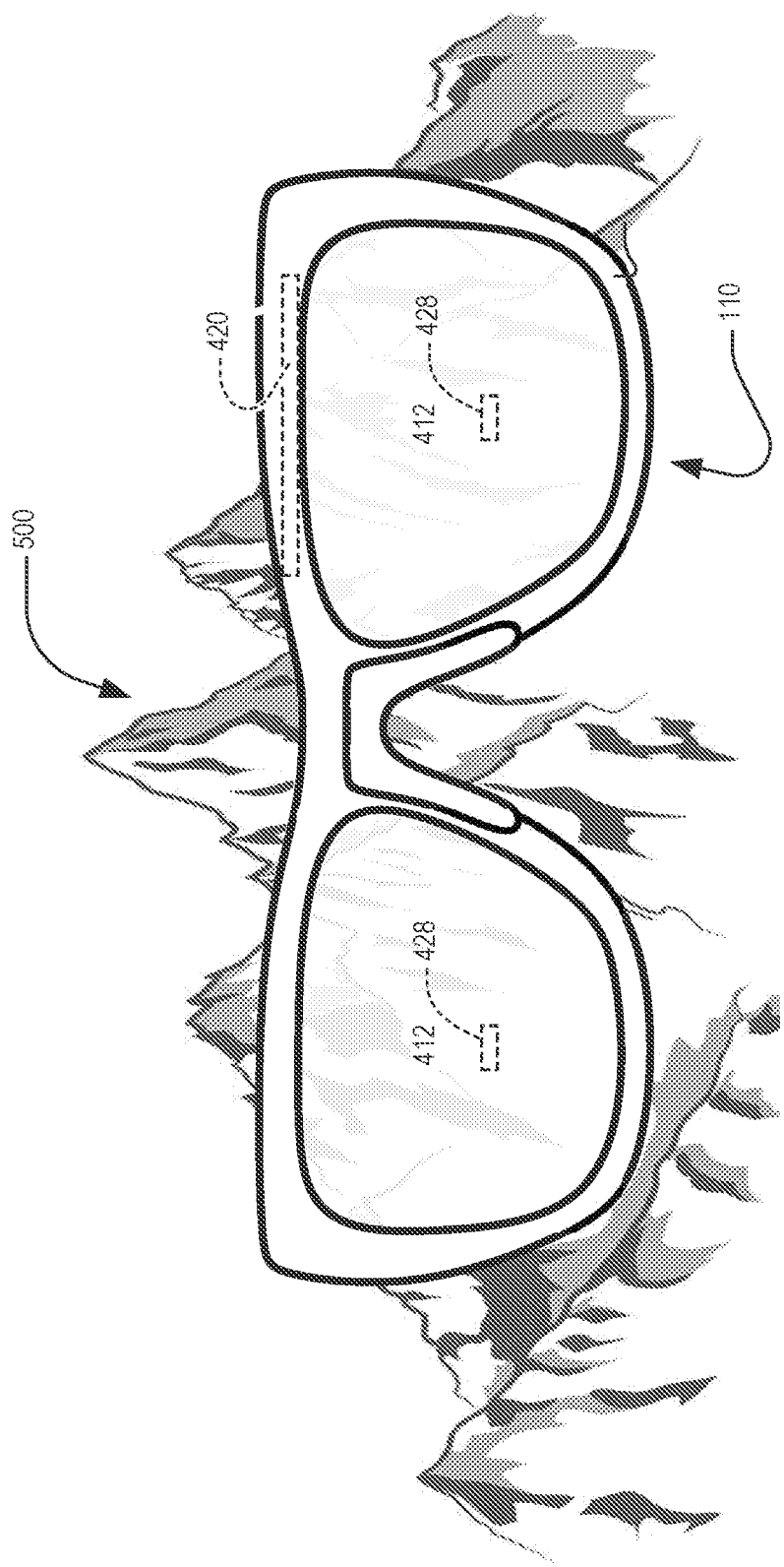
FIG. 5 is a diagram that illustrates the structure of the eyewear device as viewed by a user.

FIGS. 5-8 are diagrams that illustrate views experienced by the snowshoeing user in the above example, including illustrations of the eyewear device 110 and the augmented reality representation. FIG. 5 is a diagram that illustrates the structure of the eyewear device 110 as viewed by a user. Further shown on the eyewear device 110 are the lenses 412. In some example embodiments, the display mirror 428 is located within the lenses 412, but is substantially transparent such that it is not visible to the user. As discussed above, the display mirror 428 reflects a projection from the display mechanism 420 located within the frame of the eyewear device 110. In this example, the projection that will be reflected is an augmented reality display that includes a chronology of images, with each image projected as a sequence of image portions on the user's vision range.

Figure 6:
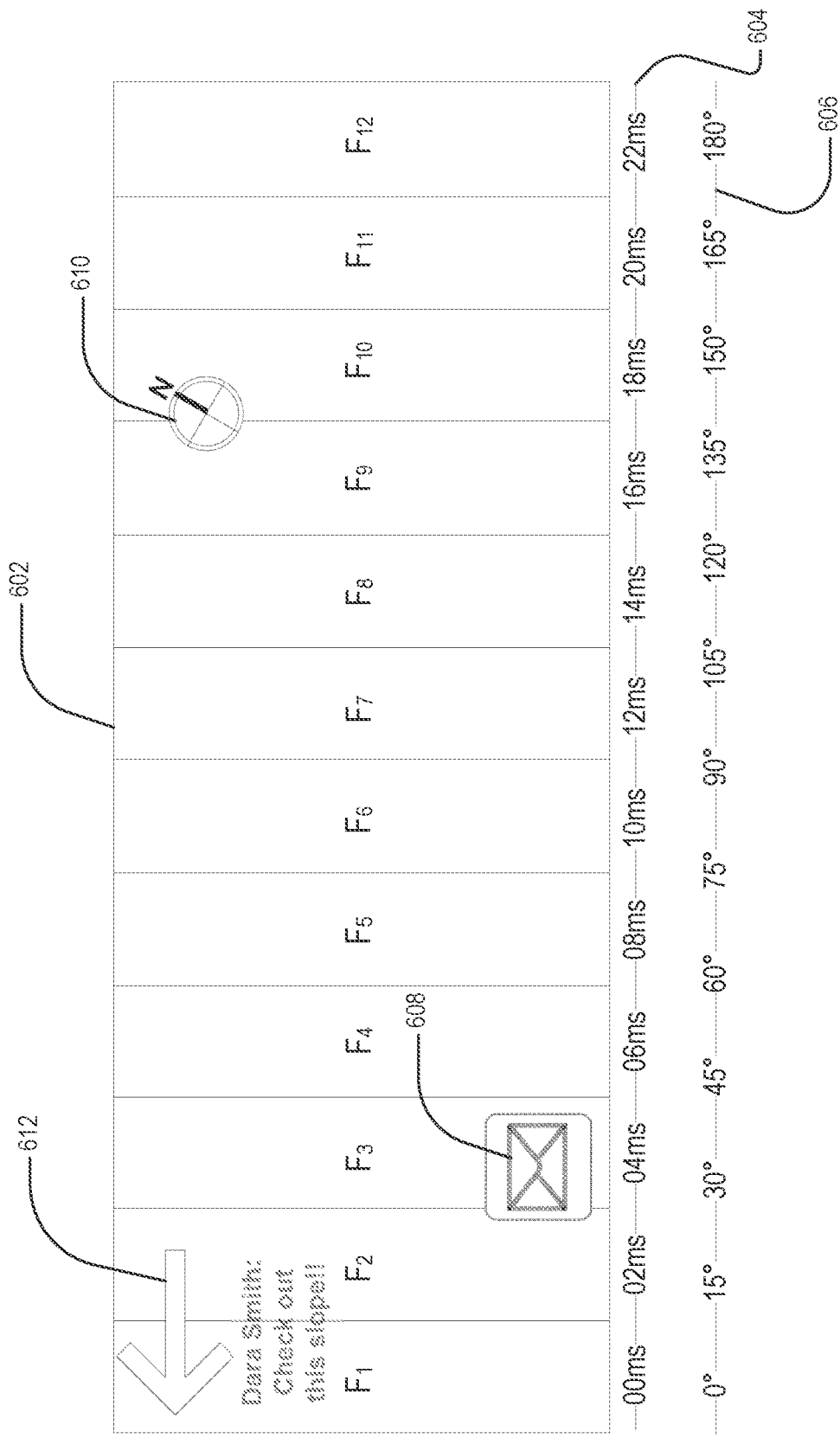
FIG. 6 is a diagram that illustrates an augmented reality display generated using the peripheral sequencing system.

FIG. 6 is a diagram that illustrates an augmented reality display generated using the peripheral sequencing system 160. FIG. 6 specifically shows the composition of the augmented reality display for the snowshoeing user 106. Image portions 602 $F_1$-$F_{12}$ are shown from left to right. Thus, for this example, the display mirror 428 (a rotating micromirror in this case) shifts in orientation to display $F_1$ first, then $F_2$ and so on. The display mechanism 420 further propagates the projection at such a fast frame rate that the user 106 is unable to notice that $F_1$ arrives any earlier than any of the other image portions or that $F_{12}$ arrives later. Most of the image portions 602 in this example ($F_4$-$F_8$, $F_{11}$, $F_{12}$) do not contain icons to overlay for the user 106. Thus, the image for these frames is transparent or semi-transparent, such that the user 106 can clearly see through them.

Below the image portions 602 is a temporal axis 604 and an angular axis 606. The temporal axis 604 designates the time that each image portion 602 is displayed. The display mechanism 420 is only able to display one distinct image at a time, but since each image portion 602 is displayed 2 ms after the previous image portion 602, all 12 image portions 602 appear to be simultaneous. The angular axis 606 designates the orientation of each image portion 602 in relation to the user's 106 viewing range. In this example, 90° represents the user's 106 central (focal) vision and 0° and 180° represent the extent of the user's 106 left and right peripheral vision, respectively.

FIG. 6 further shows the icons mentioned in the snowshoeing example. In some example embodiments, the icons are semi-translucent so the user's 106 view will not be significantly obstructed by the display. A message icon 608 is displayed as part of image portions 602 $F_2$ and $F_3$, and indicates that the user 106 has unopened messages, such as emails. A compass icon 610 is displayed as part of image portions 602 $F_9$ and $F_{10}$, and indicates a direction in which the user 106 is currently oriented. In some embodiments, the data indicating direction can be generated by a GPS program within the eyewear device 110, on the social messaging system 130, or on another client device such as a smartphone in response to sensor data from a GPS sensor. Thus, as the user 106 changes orientation, image portions 602 $F_9$ and $F_{10}$ occurring later in the chronology of images will change to reflect a changing orientation. A tag icon 612 displays an arrow showing the shortest rotation the user 106 can make to view the tag from the other user (Dara Smith) as well as the text that Dara has sent to the user 106.

Figure 7:
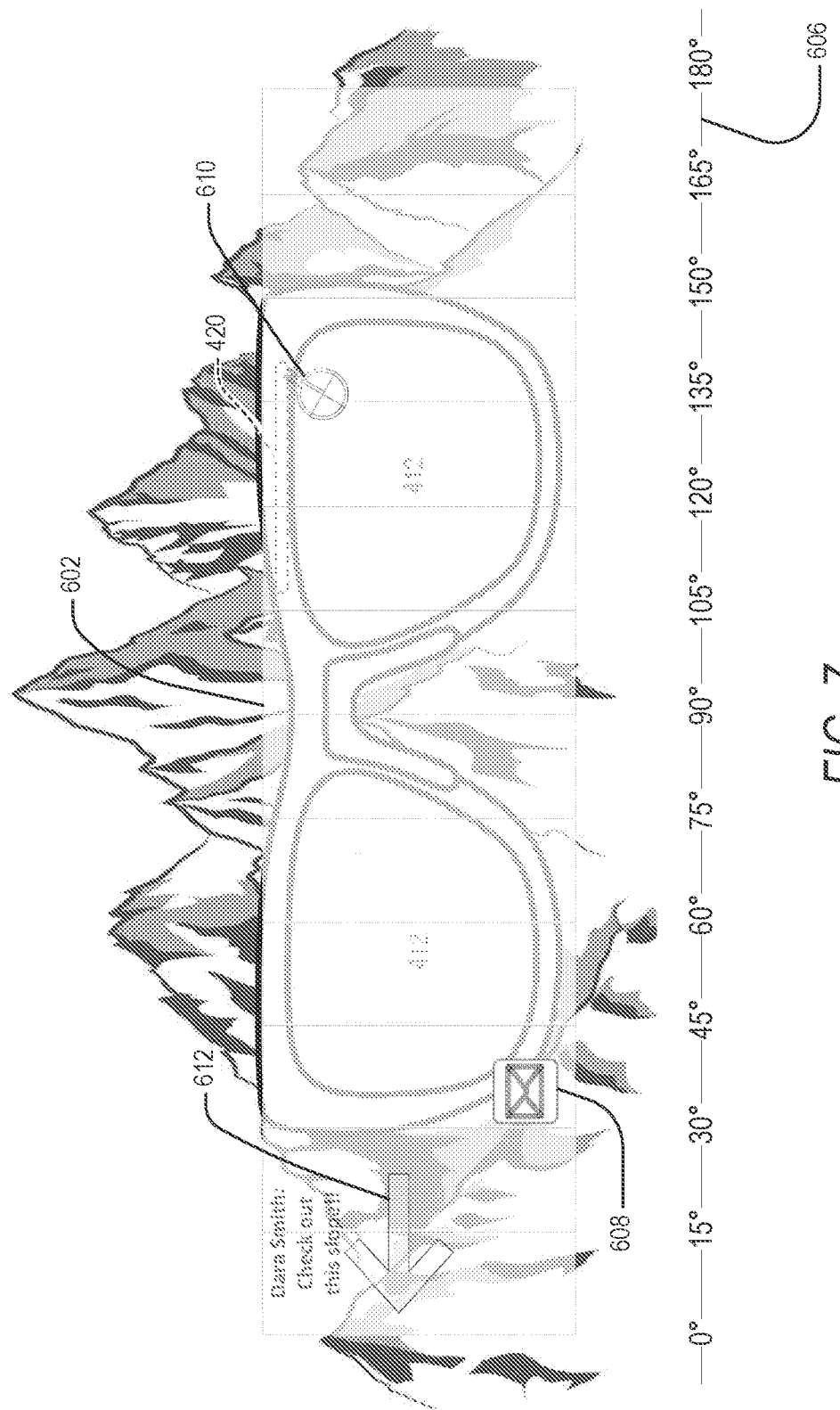
FIG. 7 is an illustration showing the image portion display of an augmented reality system overlaid on the eyewear device and the external environment.

FIG. 7 is an illustration showing the image portion display of an augmented reality system overlaid on the eyewear device 110 and the external environment. In this example, the image portions 602 are displayed to the user 106 over the user's 106 full visual range (represented by the angular axis 606). Thus, the user 106 is able to view augmented reality portions of the display that are outside the actual lenses 412 of the eyewear device 110, and may include icons such as the message icon 608, the compass icon 610, or the tag icon 612.

Figure 8:
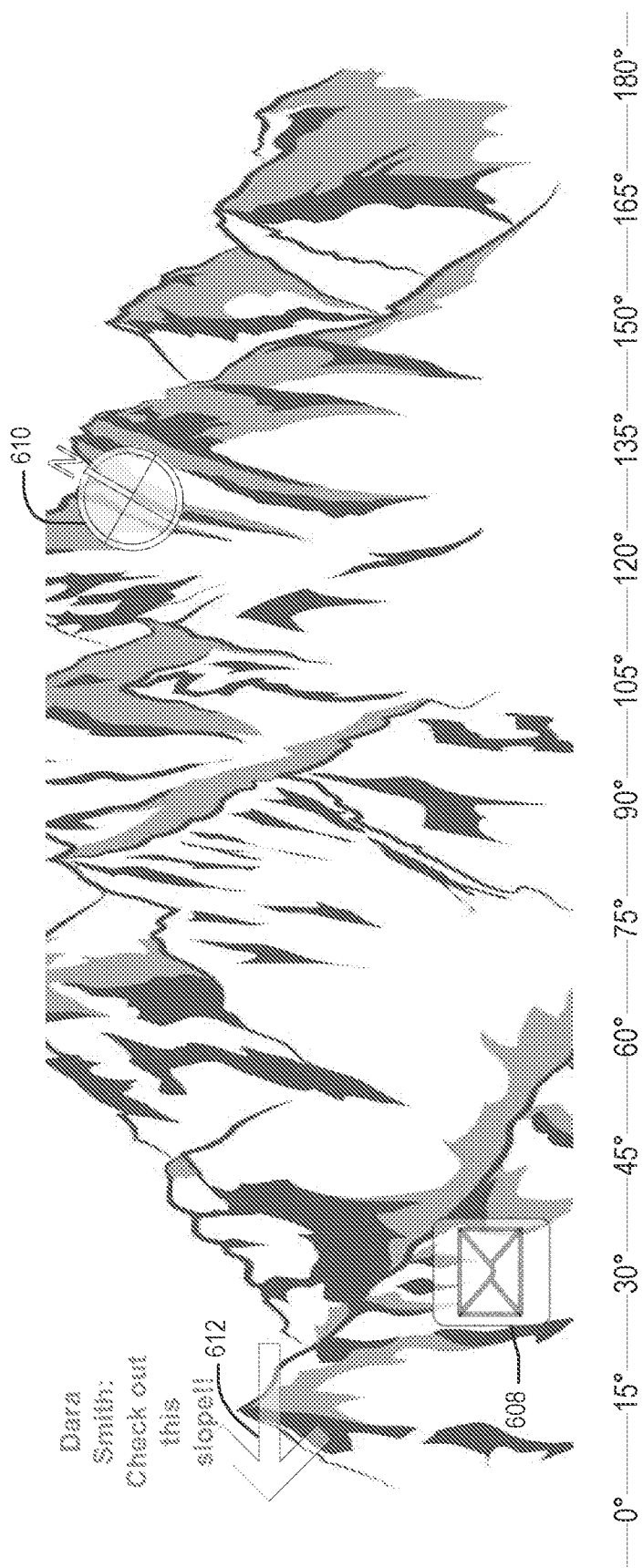
FIG. 8 is an illustration showing the augmented display without the eyewear device overlaid.

FIG. 8 is an illustration showing the augmented display without the eyewear device 110 overlaid. Thus, this view shows only the icons 608, 610, and 612 in the user's 106 view, as the user 106 will be ignoring any impeding portions of the frame of the eyewear device 110.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Any one of the aforementioned modules or another added module may operate as a peripheral sequencing system and employ one or more operations of the peripheral sequencing system 160 described herein. Additionally, the peripheral sequencing system 160 may operate in concert with the aforementioned modules or independently.

Software Architecture

Figure 9:
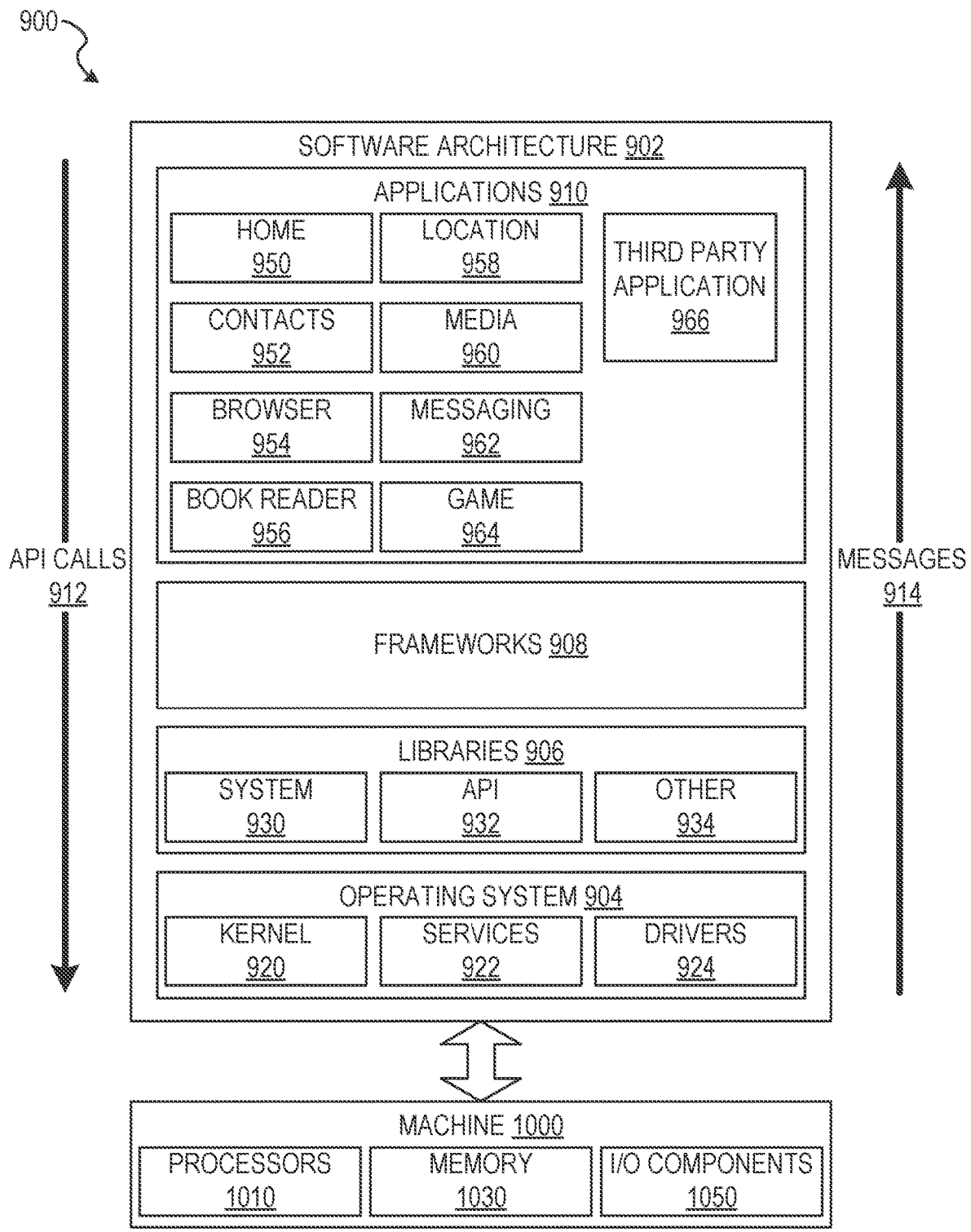
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 966 can invoke the API calls 912 provided by the operating system 904 to facilitate functionality described herein.

Example Machine Architecture and Machine-Readable Medium

Figure 10:
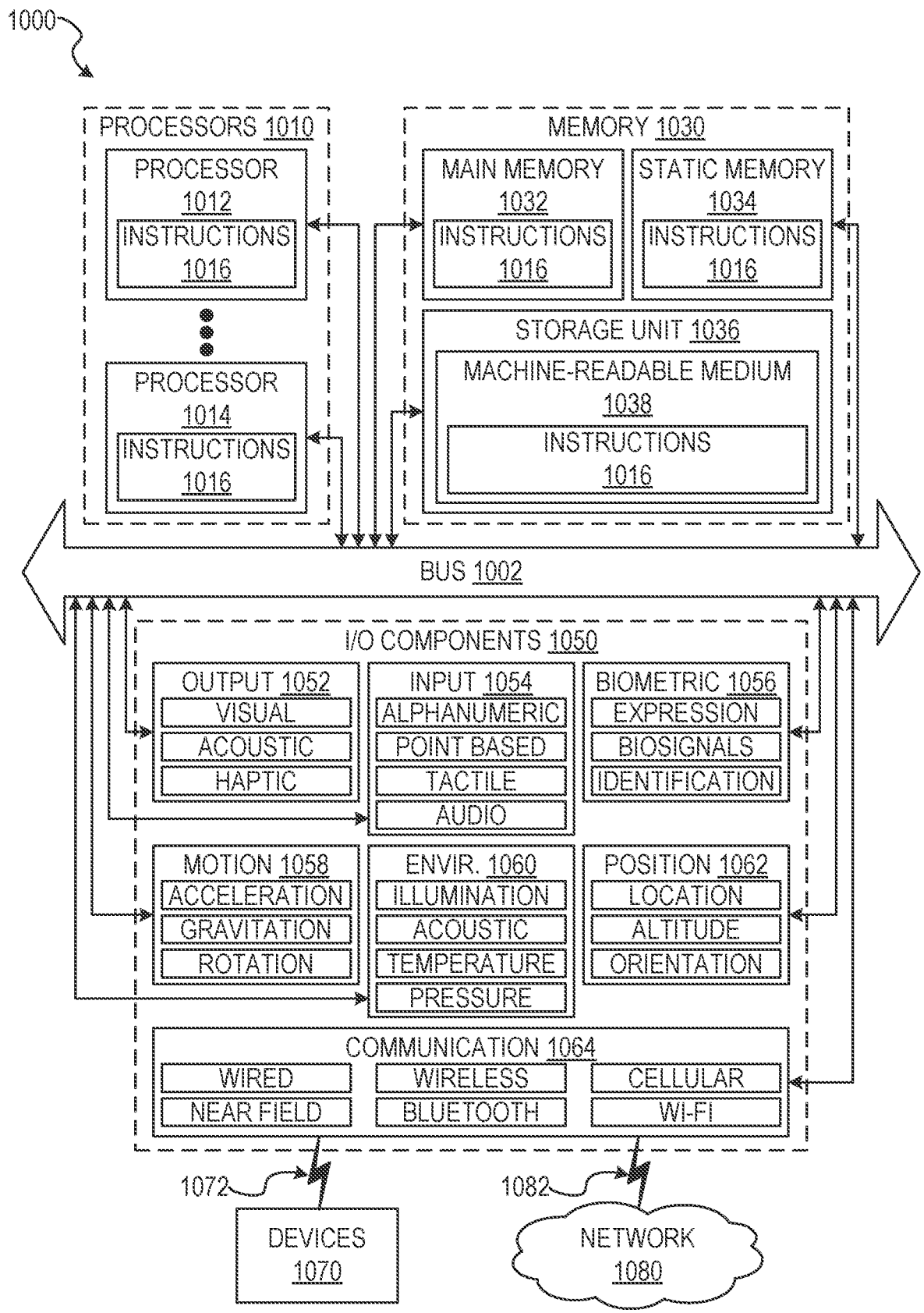
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., an accelerometer), gravitation sensor components, rotation sensor components (e.g., a gyroscope), and so forth. The environmental components 1060 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., HTTP). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating arrangement data that indicates an arrangement of image portions of an image, the image portions being along a horizontal range or a vertical range, the arrangement data comprising display characteristics, the display characteristics comprising display durations for the image portions, wherein a first image portion of the image portions comprising an icon has a display duration greater than a second image portion of the image portions without an icon; and
    causing a display, on an augmented reality (AR) display, a mixed reality (MR) display, or a virtual reality (VR) display, of the arrangement of image portions in accordance with the display durations.

2. The method of claim 1 further comprising:
    dividing the image into the image portions, the image portions arrangeable to recreate the image.

3. The method of claim 1, wherein the AR display displays a high-speed frame sequence with a shifting orientation configuration, the high-speed frame sequence including the arrangement of image portions in accordance with the display durations.

4. The method of claim 3, further comprising:
    detecting a geometric distortion caused by reflection of the high-speed frame sequence on a transmissive optical element;
    determining a geometric adjustment value to compensate for the geometric distortion; and
    adjusting the display of the high-speed frame sequence based on the geometric adjustment value.

5. The method of claim 3, wherein causing the display, on the AR display, of the arrangement of image portions includes reflecting a projection of the high-speed frame sequence off a rotating micromirror, the rotating micromirror having a rotation based on a shifting orientation configuration of the arrangement of the image portions.

6. The method of claim 5, wherein the arrangement data further comprises a current orientation of the rotating micromirror.

7. The method of claim 5, wherein causing the display, on the AR display, of the arrangement of the image portions includes projecting the arrangement of the image portions through a rotating prism, the rotating prism having a rotation based on the shifting orientation configuration.

8. The method of claim 1, wherein the arrangement data comprises a shifting orientation configuration.

9. The method of claim 1, wherein the arrangement data further comprises an arrangement of the image portions along a depth range that simulates a depth perspective, and wherein the arrangement of the image portions comprises the arrangement of the image portions along the depth range.

10. The method of claim 1, wherein the causing the display of the image portions further comprises:
    detecting a contrast distortion based on sensor data from one or more sensors compared to a coloration of the image portions;
    determining a contrast adjustment value to compensate for a geometric distortion; and
    adjusting the display of the image portions based on the contrast adjustment value.

11. A device comprising:
    an augmented reality (AR) display or virtual reality (VR) display;
    at least one processor of a machine; and
    a memory storing instructions that, when executed by the at least one processor, cause the machine to perform operations comprising:
    generating arrangement data that indicates an arrangement of image portions of an image, the image portions being along a horizontal range or a vertical range, the arrangement data comprising display characteristics, the display characteristics comprising display durations for the image portions, wherein a first image portion of the image portions comprising an icon has a display duration greater than a second image portion of the image portions without an icon; and
    causing a display, on an augmented reality (AR) display, a mixed reality (MR) display, or a virtual reality (VR) display, of the arrangement of image portions in accordance with the display durations.

12. The device of claim 11, wherein the operations further comprise:
    dividing the image into the image portions, the image portions arrangeable to recreate the image.

13. The device of claim 11, wherein the AR display displays a high-speed frame sequence with a shifting orientation configuration, the high-speed frame sequence including the arrangement of image portions in accordance with the display durations.

14. The device of claim 13, wherein the operations further comprise:
    detecting a geometric distortion caused by reflection of the high-speed frame sequence on a transmissive optical element;

determining a geometric adjustment value to compensate for the geometric distortion; and adjusting the display of the high-speed frame sequence based on the geometric adjustment value.

15. The device of claim 13, wherein causing the display, on the AR display, of the arrangement of image portions comprises reflecting a projection of the high-speed frame sequence off a rotating micromirror, the rotating micromirror having a rotation based on a shifting orientation configuration of the arrangement of the image portions.

16. The device of claim 15, wherein the arrangement data further comprises a current orientation of the rotating micromirror.

17. The device of claim 15, wherein causing the display, on the AR display, of the arrangement of the image portions includes projecting the arrangement of the image portions through a rotating prism, the rotating prism having a rotation based on the shifting orientation configuration.

18. The device of claim 11, wherein the arrangement data comprises a shifting orientation configuration.

19. A non-transitory machine-readable storage medium comprising instructions that, when executed by one or more processors of a machine, cause the machine to perform operations comprising:

generating arrangement data that indicates an arrangement of image portions of an image, the image portions being along a horizontal range or a vertical range, the arrangement data comprising display characteristics, the display characteristics comprising display durations for the image portions, wherein a first image portion of the image portions comprising an icon has a display duration greater than a second image portion of the image portions without an icon; and causing a display, on an augmented reality (AR) display, a mixed reality (MR) display, or a virtual reality (VR) display, of the arrangement of image portions in accordance with the display durations.

20. The non-transitory machine-readable storage medium of claim 19, wherein the operations further comprise:

dividing the image into the image portions, the image portions arrangeable to recreate the image.

* * * * *